Patented Apr. 7, 1936

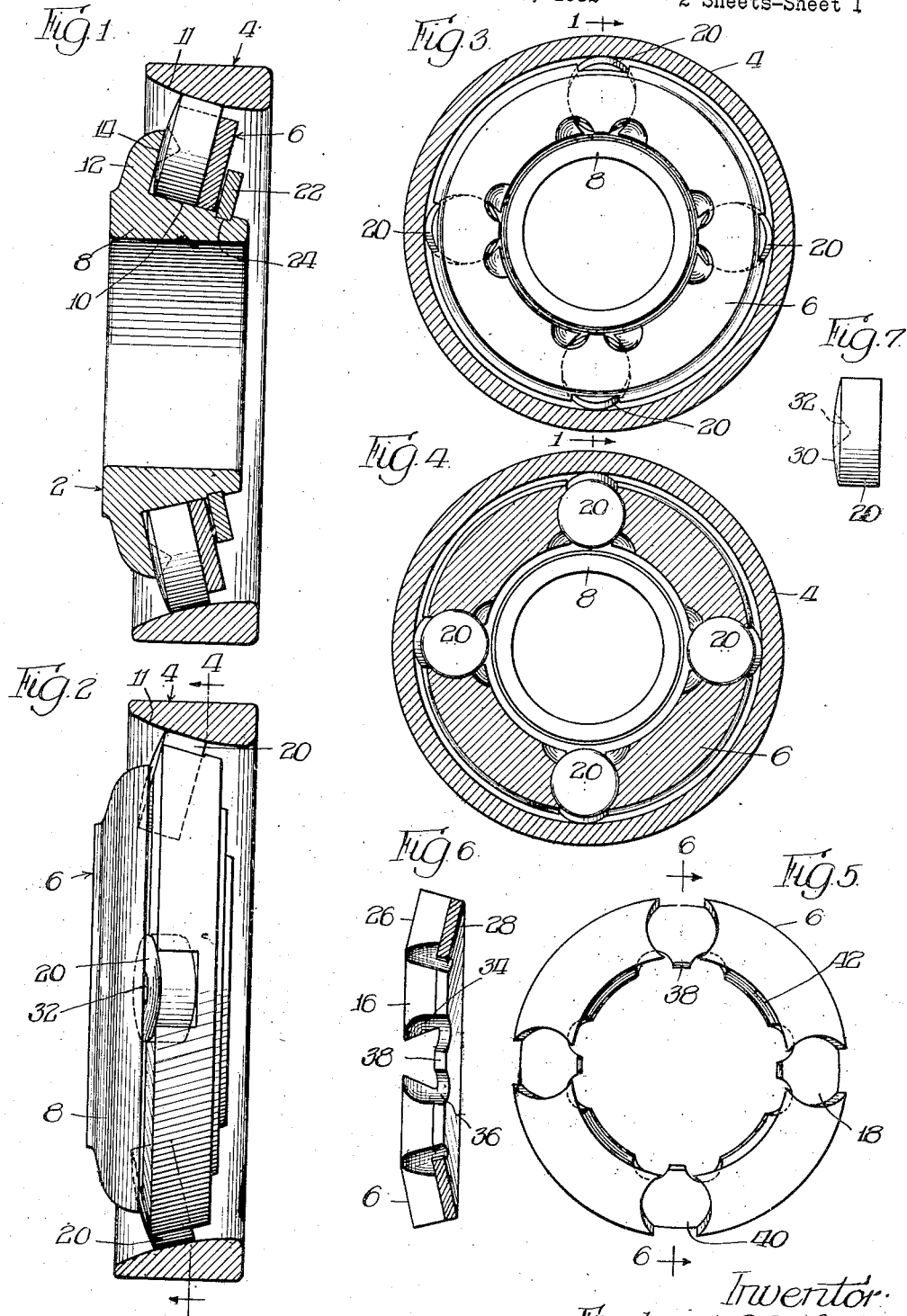

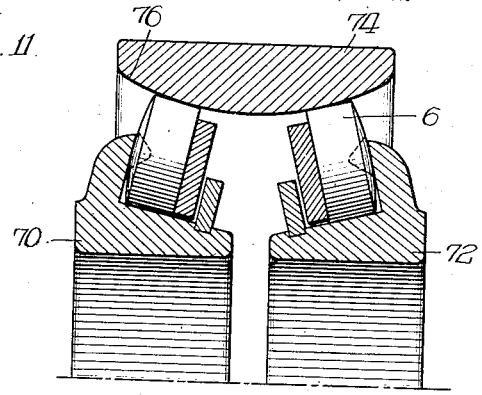
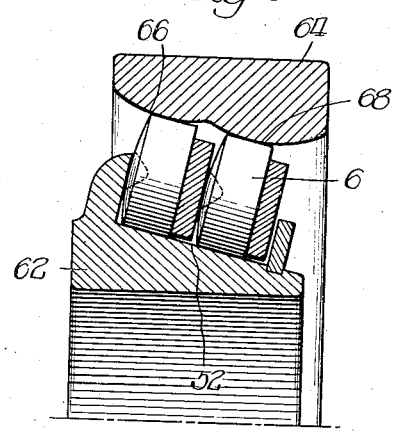
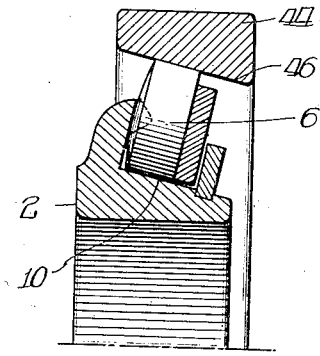
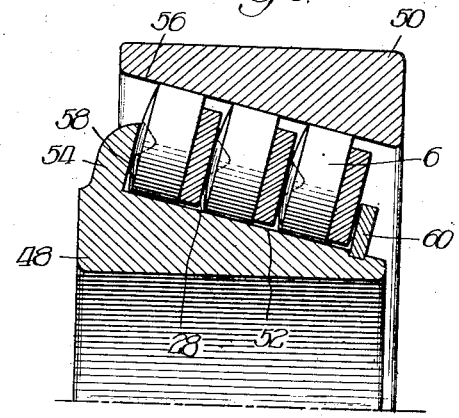

2,036,507

UNITED STATES PATENT OFFICE 2,036,507

ROLLER BEARING

Frederick George Seifarth, Chicago, Ill., assignor of one-half to Non-Pareil Manufacturing Co., Chicago, Ill., a corporation of Illinois Application March 19, 1932, Serial No. 599,959

24 Claims. (Cl. 308—214)

The present invention relates to bearing assemblies and more in particular to bearing assemblies particularly adapted for high speed work.

Among the objects of the present invention is to provide a novel bearing assembly or device adapted for use in conjunction with high speed work in which the various elements thereof are so constructed and assembled as to maintain their relative operative positions during use and operation, thereby resulting in maintaining the elements with which the same are associated in proper alignment, and wherein these latter elements are not subject to wear and whip action.

The present invention comprehends the idea of providing a novel bearing assembly in which the various elements thereof are of such a construction and cooperate with one another in such a manner as to provide for efficient and effective lubrication during operation.

Still another object of the present invention is to provide a novel bearing assembly in which the anti-friction or roller bearing members and abutment means therefor cooperate to provide for a film of lubricant therebetween during the operation of the assembly, thereby effectively lubricating these cooperating parts to prevent excessive or undue wear thereon.

A still further object of the present invention is to provide a novel bearing assembly in which the anti-friction or roller bearing members thereof are formed with a central depressed portion which is in spaced relation with the surface of an abutment means or member, thereby doing away with the rubbing action of these roller bearing members on the abutment means or member, which would otherwise cause undue or excessive wear, with the result that the various elements of the assembly would be out of proper alignment in a very short time.

The present invention also contemplates the idea of providing a novel bearing assembly in which the anti-friction or roller bearing members thereof are formed with a crowned surface adapted to cooperate with an abutment surface of dished construction, thereby providing a device in which there is substantially a surface contact in the form of a curved line between the abutment and substantially through the center of the roller bearing members so as to maintain and retain a lubricant in the form of a film therebetween and to provide proper lubrication of these relatively movable elements.

Another object within the purview of the present invention is to provide a novel retaining member or cage for a bearing assembly which is of such a construction as to provide for the outward movement of lubricant under centrifugal action so as to properly lubricate the contacting areas of the retaining member or cage with a member for retaining the assembly in operative position.

More particularly, such novel means for providing for the outward flow of lubricant comprises suitable groove portions associated with the roller bearing members which provide passage means from the roller bearing members and the associated portions of the retaining member to the surface portions of the cage or retaining member in contact with the retaining member.

The present invention also includes the idea of providing a retaining member in a bearing assembly of novel construction, whereby the retaining member is independently carried or supported upon one of the bearing members of the device so as to leave the roller bearing members free thereof during the operation of the device. More particularly, the construction involves a cage or retaining member which is carried on the surface of the inner bearing member, preferably over an area which is not in contact with the roller members, thus eliminating possibility of damage to the surface with which these roller members have rolling contact.

Other objects, features, capabilities and advantages are comprehended by the invention, as will later appear and as are inherently possessed thereby.

Referring to the drawings:

Figure 1 is a view in cross section of a bearing assembly made in accordance with the present invention;

Figure 2 is a view similar to Figure 1 of the drawings disclosing the inner members of the bearing assembly in elevation;

Figure 3 is a view in elevation of the embodiment shown in Figure 1 of the drawings with parts removed to more clearly disclose the construction thereof;

Figure 4 is a view in cross section taken in a plane represented by line 4—4 of Figure 2 of the drawings;

Figure 5 is a detached view in elevation of a retaining member made in accordance with the present invention;

Figure 6 is a view in cross section taken in a plane represented by line 6—6 of Figure 5 of the drawings;

Figure 7 is a detached view in elevation of an anti-friction or roller bearing member made in accordance with the present invention;

Figure 8 is a fragmentary view in cross section of another bearing assembly made in accordance with the present invention.

Figure 9 is a fragmentary view in cross section of still another bearing assembly made in accordance with the present invention;

Figure 10 is a fragmentary view in cross section of another alternative construction for a bearing assembly made in accordance with the present invention; and Figure 11 is a fragmentary view in cross section of still another alternative construction for a bearing assembly made in accordance with the present invention.

Referring now more in detail to the drawings, a bearing assembly made in accordance with the present invention is disclosed as comprising an inner bearing member or racering 2 and an outer bearing member or racering 4, between which is an anti-friction or roller bearing unit, generally designated as 6. The inner racering is formed with a hub portion 8 provided with a bearing surface 10 which constitutes a portion of a conical surface generated by rotation of a straight line about a point in the axis of rotation of this member. This inner racering is further formed with an integral and laterally extending abutment 12 having a surface portion 14 substantially normal to the conical bearing surface 10 in planes through the axis of rotation of this inner bearing member 2, so as to provide an abutment surface of dished construction or substantially constituted by a portion of a conical surface generated by the rotation of a straight line about the axis of rotation of this inner racering or bearing member 2.

Operatively associated with the bearing members 2 and 4 is the roller bearing unit 6 which comprises a retainer or cage member 16, as more particularly disclosed in Figures 5 and 6 of the drawings, which is formed with a plurality of recesses 18 adapted to receive a plurality of anti-friction or roller bearing members 20, this roller bearing unit being retained in its proper relation with the inner bearing member 2, as by means of a split retaining ring or member 22 adapted to be sprung over the hub 8 of the inner bearing member and be received within a groove 24 provided therein. The roller bearing members 20 of the roller bearing unit 6 have substantial surface contact with the bearing surface 10 of the inner bearing member 2 and substantially a rolling line contact with the outer bearing member 4, the outer bearing member 4, as clearly shown in this embodiment, being formed with a bearing surface 11 substantially arcuate in planes through the axis of rotation thereof.

The retaining member or cage 16 is substantially annular in shape and is formed with the substantially parallel surfaces 26 and 28 corresponding substantially to the surface 14 of the abutment 12, and these surfaces are constituted by portions of a conical surface generated by straight lines revolved about points on the axis of rotation of this retaining member. When the roller bearing unit 6 is in an operative position, as shown in Figure 1 of the drawings, the roller bearing members 20 received within the recesses 18 of the retaining member 16 protrude slightly beyond or extend laterally of the surface 26 for contacting engagement with the surface 14 of the abutment 12, this abutment 12 being provided for holding these roller bearing members against lateral movement during the operation of the device.

In order to provide for the proper lubrication of the contacting surfaces of the roller bearing members 20 and the surface 14 of the abutment 12, the roller bearing members 20 are formed with a crowned surface 30, whereby there is substantially surface contact in the form of a curved line between the abutment and adjacent the central portion of the roller bearing members 20 which is properly lubricated by a film of lubricant between the roller bearing member 20 and the surface 14, thereby properly protecting these contacting elements against excessive or undue wear during operation of the device. The crowned surface 30 is further formed with a depressed portion 32 concentric with the axis of rotation of the roller bearing members 20, thereby removing a substantial portion of the surface of the roller bearing members 20 which would otherwise contact with the surface 14, thus eliminating the rubbing action of the dead center and adjacent portions of the roller bearing members 20, which would otherwise cause wear on the surface 14 of the abutment member 12.

In order to properly lubricate the contacting surface of the retaining member or cage 16 and the retaining ring 22, the retainer 16 is formed with transversely disposed grooves, such as the grooves 34 and 36, which intercept the recesses 18 and are spaced apart as by means of a projecting plate portion 38 forming an integral part of the back wall 40 of each of the recesses 18. Each of these grooves 34 and 36 is inclined outwardly relative to the axis of rotation of the retaining member so as to provide passageways for movement of a lubricant outwardly under centrifugal action and within the space between the retainer or cage 16 and the retaining ring 22, thereby properly lubricating these associated elements of the abutment during its operation.

The present invention, because of its adaptability in devices for high speed work, contemplates the idea of forming a roller bearing unit in which the retaining member or cage thereof is supported independently of the anti-friction or roller bearing members. In the present embodiment selected to illustrate the invention, the portions 42 of the retaining member or cage intermediate the recesses 18 thereof are formed so as to cooperate with the conical surface 10 of the inner bearing member 2, whereby the dead weight of the retaining member or cage is taken by the inner bearing member 2 so that the roller bearing members 20 are free of the retaining member during operation of the assembly.

In Figure 8 of the drawings, a roller bearing unit 6, similar in construction to the roller bearing heretofore disclosed, is disclosed in association with an inner bearing member 2 corresponding in construction to the bearing member 2 of the previously described embodiment, and an outer bearing member 44. The roller bearing members 20 of the roller bearing unit 6 in this embodiment have a substantial surface contact with the conical surface 10 of the inner bearing member 2, as likewise with the bearing surface 46 of the outer bearing member 44, which is formed substantially parallel to the bearing surface 10.

In Figure 9 of the drawings, a plurality of roller bearing units 6 are shown as being disposed between an inner bearing member 48 and an outer bearing member 50, the inner bearing member 48 being formed with a substantially conical surface 52 corresponding to the conical surface 10 of the hereinbefore described embodiments, as likewise with an integral abutment 54 corresponding substantially to the abutment 12 of the embodiment shown in Figure 1 of the drawings. The roller bearing members 20 of the roller bearing units 6 in the present embodiment have substantial rolling surface contact with the bearing surface 52 of the inner bearing member 48, as likewise with the bearing surface 56 of the outer bearing member 50, which is substantially parallel to the bearing surface 52.

In the present embodiment, the roller bearing members 20 of the roller bearing unit adjacent the abutment 54 cooperate with the dished surface 58 thereof in a manner corresponding to the cooperation between the roller bearing members and the dished surface 14 of the embodiment shown in Figure 1 of the drawings. The roller bearing members of the roller bearing units adjacent thereto, however, cooperate with the dished surface 28 of the retaining members of adjacent units in a manner corresponding to the cooperation of the roller bearing members with the surface 58 of the abutment 54, whereby these contacting surfaces are properly lubricated. As in the hereinbefore disclosed embodiments, the plurality of roller bearing units 6 are retained in association with the inner bearing member 48 as by means of a split ring 60 corresponding to the split ring 22 of the bearing assembly shown in Figure 1 of the drawings.

In Figure 10 of the drawings, a plurality of roller bearing units 6 are shown in association with an inner bearing member 62 corresponding in all essentials with the bearing member 48 of the embodiment shown in Figure 9 of the drawings, and an outer bearing member 64. In this embodiment, the roller bearing members 20 of the roller bearing units 6 have substantial rolling surface contact with the conical bearing surface 52 on the inner bearing member 62 and merely a substantial rolling line contact with the outer bearing member 64, this substantial rolling line contact between the roller bearing members 20 and the outer bearing member 64 being obtained by forming the bearing surface of this outer bearing member with arcuate portions 66 and 68 in planes through the axis of rotation thereof.

In Figure 11 of the drawings, a plurality of roller bearing units 6 are shown as being independently associated with separate inner bearing members 70 and 72 and a single outer bearing member 74, the inner bearing members 70 and 72 being substantially of the same construction as the inner bearing member 2 of the assembly shown in Figure 1 of the drawings. In this embodiment, the bearing surface 76 of the outer bearing member 74 is of a continuous arcuate formation in planes through the axis of rotation of this outer bearing member, thereby providing for substantial rolling line contact with the roller bearing members 20 of the roller bearing units 6.

From the above disclosure, it will be quite apparent that a bearing assembly has been provided in which the various parts thereof are not subjected to undue or excessive wear during operation of the device and that the same are always maintained in alignment, thereby adapting the bearing assembly made in accordance with the present invention for use in conjunction with devices for high speed work. Further, it will be seen that the various elements of the device having contacting engagement during operation of the assembly, are properly and efficiently lubricated, thereby reducing and substantially eliminating wear which would otherwise cause a misalignment of the various parts.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. In a bearing assembly, the combination of spaced bearing members, one of said members being provided with a hub portion and an abutment, a plurality of cylindrical anti-friction members between said bearing members, a cage member for said anti-friction members, and means for supporting said cage member on said hub portion independently of said anti-friction members, said abutment having a dished surface, said anti-friction members being provided with a crowned surface cooperating with said dished surface and having substantially a line contact therewith substantially through the axis of rotation of said anti-friction members.

2. In a bearing assembly, the combination of spaced bearing members, one of said members being provided with a hub portion and an abutment, a plurality of cylindrical anti-friction members between said bearing members, and a cage member for said anti-friction members, said anti-friction members being received within recesses provided in said cage member and contacting with said abutment, said abutment having a dished surface, said anti-friction members being provided with a crowned surface cooperating with said dished surface and having substantially a line contact therewith substantially through the axis of rotation of said anti-friction members.

3. In a bearing assembly, the combination of spaced bearing members, one of said members being provided with a hub portion and an abutment, a plurality of cylindrical anti-friction members between said bearing members, and a cage member for said anti-friction members, said anti-friction members being received within recesses provided in said cage member and contacting with said abutment in substantially a line through the axis of rotation of said members, and portions between said recesses engaging said hub portion for supporting said cage member independently of said anti-friction members.

4. In a bearing assembly, the combination of spaced bearing members, one of said members being provided with a hub portion and an abutment, a plurality of cylindrical anti-friction members between said bearing members, and a cage member for said anti-friction members, said anti-friction members being received within recesses provided in said cage member and contacting with said abutment, said abutment having a dished surface, said anti-friction members being provided with a crowned surface cooperating with said dished surface in substantially a line through the axis of rotation of said members, and portions between said recesses engaging said hub portion for supporting said cage member independently of said anti-friction members.

5. In a bearing assembly, the combination of spaced bearing members, a plurality of anti-friction members therebetween, a cage member for said anti-friction members, a retaining member secured to one of said bearing members and abutting said cage member to prevent lateral displacement thereof, and means for directing a lubricant outwardly between said cage and retaining members under centrifugal action.

6. In a bearing assembly, the combination of spaced bearing members, a plurality of anti-friction members therebetween, a cage member for said anti-friction members, a retaining member secured to one of said bearing members and abutting said cage member to prevent lateral displacement thereof, and a plurality of grooves inclined outwardly toward said retaining member for guiding the flow of lubricant outwardly and between said cage and retaining members under centrifugal action.

7. In a bearing assembly, the combination of spaced bearing members, a plurality of anti-friction members therebetween, a cage member for said anti-friction members, said anti-friction members being received within recesses provided in said cage member, a retaining member secured to one of said bearing members and abutting said cage member to prevent lateral displacement thereof, and passage means communicating with said recesses for guiding lubricant outwardly and between said cage and retaining members under centrifugal action.

8. In a bearing assembly, the combination of spaced bearing members, a plurality of anti-friction members therebetween, a cage member for said anti-friction members, and a retaining member secured to one of said bearing members and abutting said cage member to prevent lateral displacement thereof, said cage member being formed with inclined transversely disposed grooves for guiding the flow of lubricant outwardly and between said cage and retaining members under centrifugal action.

9. In a bearing assembly, the combination of spaced bearing members, a plurality of anti-friction members therebetween, a cage member for said anti-friction members, said anti-friction members being received in recesses provided in said cage member, and a retaining member secured to one of said bearing members and abutting said cage member to prevent lateral displacement thereof, said cage member being formed with inclined transversely disposed grooves communicating with said recesses for guiding the flow of lubricant outwardly and between said cage and retaining members under centrifugal action.

10. In a bearing assembly, the combination of inner and outer race-rings, a plurality of anti-friction members between said race-rings, said inner race-ring having a rolling surface for said members angularly disposed in relation to the axis thereof, and an abutment member substantially normal to said surface in a plane through said axis providing a dished abutment surface, said anti-friction members having a crowned surface provided with a depressed portion substantially concentric with the axis of rotation thereof, said surface cooperating with said dished surface over substantially a line passing substantially through the center of said depressed portion.

11. In a bearing assembly, the combination of inner and outer race-rings, a plurality of anti-friction members between said race-rings, said inner race-ring having a rolling surface for said members angularly disposed in relation to the axis thereof, said outer race-ring having a rolling surface for said members substantially parallel to the rolling surface of said inner race-ring, and an abutment member substantially normal to said surface in a plane through said axis providing a dished abutment surface, said anti-friction members having a crowned surface provided with a depressed portion substantially concentric with the axis of rotation thereof, said surface cooperating with said dished surface over substantially a line passing substantially through the center of said depressed portion.

12. In a bearing assembly, the combination of inner and outer race-rings, an abutment member formed with a dished surface, a plurality of anti-friction units between said race-rings, each having a retaining member, a plurality of anti-friction members associated with each of said retaining members, said anti-friction members having a crowned surface, said dished surface cooperating with the crowned surface of the anti-friction members of one of said members, and said retaining members being formed with a dished surface cooperating with the crowned surface of said anti-friction member of an adjacent unit.

13. In a bearing assembly, the combination of spaced bearing members, one of said members being provided with an abutment, a plurality of rollers between said members, each of said rollers having substantially a line contact with said abutment substantially through the axis of rotation thereof, and means for holding said rollers in said contacting relation with said abutment.

14. In a bearing assembly, the combination of spaced bearing members, one of said members being provided with an abutment, a plurality of rollers between said members, each of said rollers having substantially a curved line contact with said abutment substantially through the axis of rotation thereof, and means for holding said rollers in said contacting relation with said abutment.

15. In a bearing assembly, the combination of spaced bearing members, one of said members being provided with an abutment having a dished surface, a plurality of rollers between said members each having a crowned surface contacting with said dished surface, said contacting between said rollers and abutment being substantially in a line substantially through the axis of rotation thereof, and means for holding said rollers in said contacting relation with said abutment.

16. In a bearing assembly, the combination of spaced bearing members, one of said members being provided with an abutment, a plurality of rollers between said members, each of said rollers having substantially a line contact with said abutment substantially through the axis of rotation thereof, and a cage member for said rollers supported independently thereof.

17. In a bearing assembly, the combination of spaced bearing members, a plurality of rollers therebetween, one of said members having an abutment cooperating with said rollers, and a cage member for said rollers, said cage having transversely disposed portions between said rollers supported by one of said members independently of said rollers.

18. In a bearing assembly, the combination of spaced bearing members, a plurality of rollers therebetween, one of said members having an abutment cooperating with said rollers, and a cage member for said rollers, said cage having recesses for said rollers disposed in opposite relation to said abutment, said cage having transversely disposed portions between said recesses supported by one of said members whereby the cage is supported independently of said rollers.

19. In a bearing assembly, the combination of spaced bearing members, a plurality of rollers therebetween, one of said members having an abutment cooperating with said rollers, and a cage member for said rollers, said cage having recesses for said rollers disposed in opposite relation to said abutment, said cage having transversely disposed portions between said recesses supported by the inner of said members whereby the cage is supported independently of said rollers.

20. In a bearing assembly, the combination of spaced bearing members, one of said members being provided with an abutment, a plurality of rollers between said members, each of said rollers having an interrupted substantially line contact with said abutment substantially through the axis of rotation of the same.

21. In a bearing assembly, the combination of spaced bearing members, one of said members being provided with an abutment, a plurality of rollers between said members, each of said rollers having line contact with said abutment substantially through the center of rotation except that said rollers have a central portion spaced from said abutment interrupting said contact over the end of the same.

22. In a bearing assembly, the combination of an inner and an outer race-ring, said inner race-ring being frusto-conical and having an abutment having a dish shaped surface, a plurality of rollers between and cooperating with said race-rings, each of said rollers having a crowned end surface cooperating with said abutment surface, the contact between said rollers and abutment being over a line substantially through the axis of rotation of said rollers.

23. In a bearing assembly, the combination of an inner and an outer race-ring, said inner race-ring being frusto-conical and having an abutment having a dish shaped surface, a plurality of rollers between and cooperating with said race-rings, each of said rollers having a crowned end surface cooperating with said abutment surface, each of said rollers being spaced from said abutment surface adjacent the axis of rotation thereof, the contact between each of the rollers and abutment being over a line substantially through the axis of rotation of said rollers except adjacent said axis of rotation.

24. In a bearing assembly, the combination of an inner and an outer race-ring, one of said race-rings having a frusto-conical bearing surface and an abutment having a dish shaped surface, the other of said race-rings having a curved bearing surface, a plurality of rollers between and cooperating with the bearing surface of said rollers, each of said rollers being spaced from said abutment surface adjacent the axis of rotation thereof, the contact between each of the rollers and abutment being over a line substantially through the axis of rotation of said rollers except adjacent said axis of rotation.

FREDERICK GEO. SEIFARTH.